United States Patent
Lee et al.

(10) Patent No.: US 8,383,173 B2
(45) Date of Patent: *Feb. 26, 2013

(54) METHOD OF MAKING BREAD

(75) Inventors: Myoung Gu Lee, Seoul (KR); Byung Keon Son, Seongnam-si (KR); Jong Min Lee, Seongnam-si (KR)

(73) Assignee: Paris Croissant Co., Ltd., Songham-Shi, Kyoungki-Do (KR)

( * ) Notice: Subject to any disclaimer, the term of this patent is extended or adjusted under 35 U.S.C. 154(b) by 240 days.

This patent is subject to a terminal disclaimer.

(21) Appl. No.: 12/418,493

(22) Filed: Apr. 3, 2009

(65) Prior Publication Data

US 2010/0255148 A1 Oct. 7, 2010

(51) Int. Cl.
*A21D 8/02* (2006.01)

(52) U.S. Cl. .......... 426/19; 426/61; 426/62; 426/496

(58) Field of Classification Search .......... None
See application file for complete search history.

(56) References Cited

U.S. PATENT DOCUMENTS

| | | | | |
|---|---|---|---|---|
| 4,847,104 A | * | 7/1989 | Benjamin et al. | 426/549 |
| 5,171,590 A | * | 12/1992 | Sluimer | 426/19 |
| 5,451,417 A | * | 9/1995 | Freyn et al. | 426/551 |
| 5,560,946 A | * | 10/1996 | Sanders et al. | 426/94 |
| 6,589,582 B2 | * | 7/2003 | Saito et al. | 426/504 |

OTHER PUBLICATIONS

Wayne Gisslen, "Professional Baking", 1986, pp. 54-55.*

* cited by examiner

*Primary Examiner* — Lien Tran

(74) *Attorney, Agent, or Firm* — patenttm.us

(57) ABSTRACT

A method of making bread is provided. The method includes a thermally treated dough making process of forming a thermally heated dough, a dough mixing process of mixing the thermally treated dough of the thermally treated dough making process with wheat flour, dried yeast, refined sugar, refined salt, whole milk powder, bread improver, processed butter, milk, egg, and water to form a dough mixture, and stirring the dough mixture, a deep-freezing process of dividing the dough mixture into equal-sized dough pieces and deep-freezing the divided dough pieces, a thawing process of thawing the deep-frozen dough pieces, a fermentation process of fermenting the thawed dough pieces, and a baking process of heating the fermented dough pieces.

1 Claim, 1 Drawing Sheet

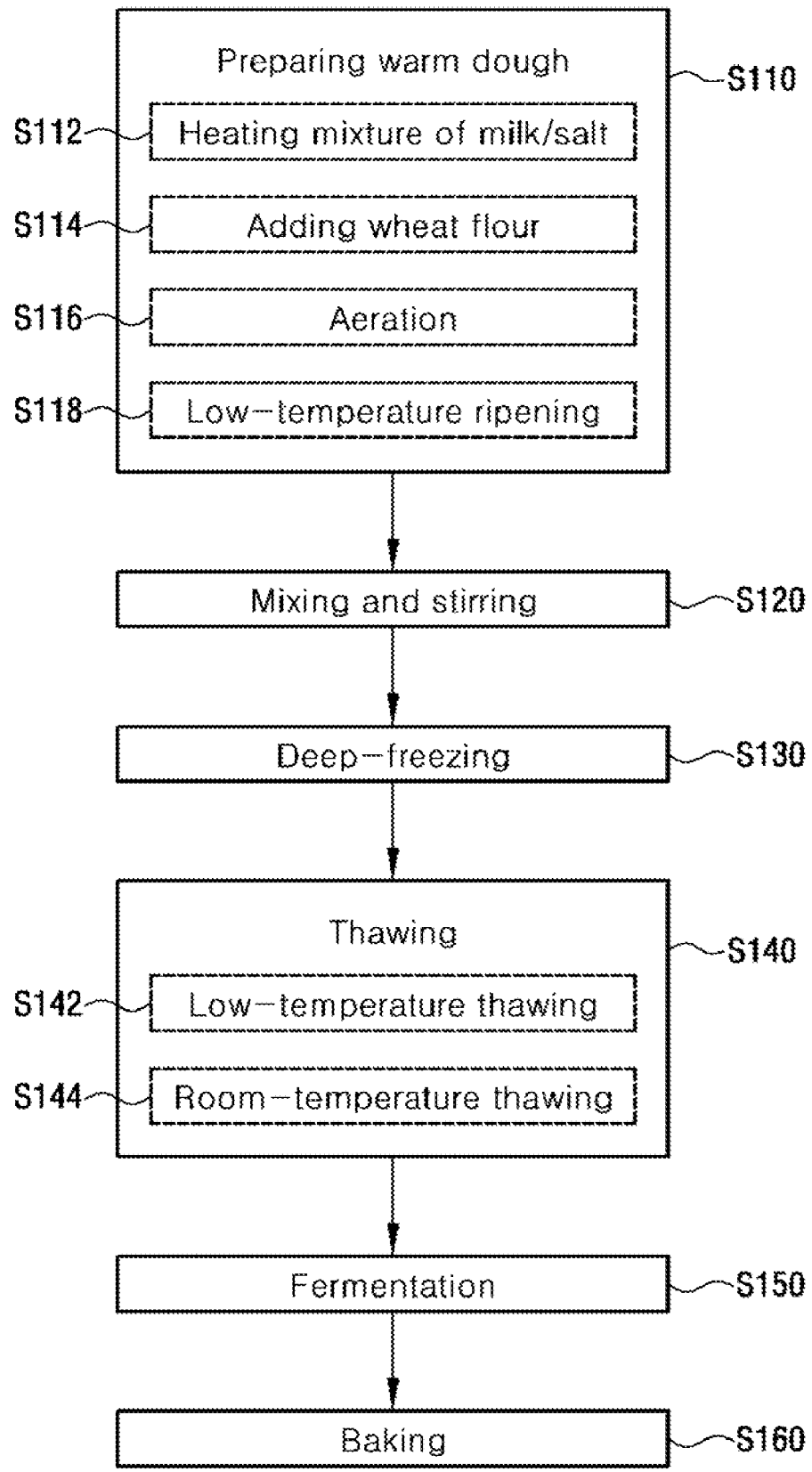

METHOD OF MAKING BREAD

BACKGROUND OF THE INVENTION

1. Field of the Invention

The present invention relates to bread and, more particularly, to a method of making bread using warm dough.

2. Description of Related Art

In general, white breads are box-shaped breads and may be classified into English breads made in the shape of a mountain peak by allowing the top thereof to rise, and American breads having a flat top made by baking dough placed in a bread pan with a closed cover.

The breads may also be classified into lean breads to which little sugar, milk or oil are added, and rich breads to which lots of sugar, milk and oil are added. The lean breads are used to make toast, and the rich breads are used to make sandwiches and are also called American breads.

Conventionally, the breads are made by a so-called straight method. According to the straight method, bread is made by placing raw ingredients in a mixer to be mixed all at once. The straight method includes:

1. mixing raw ingredients to form a dough, immediately dividing the dough into dough pieces, and freezing the divided dough pieces;
2. thawing the frozen dough at low temperature and then further thawing the resulting dough at room temperature until the temperature of the dough reaches about 18° C.;
3. dividing the thawed dough to fit a bread pan, rolling out the resulting dough, and ripening the resulting dough at room temperature;
4. placing the ripened dough in the pan to be fermented; and
5. baking the fermented dough.

However, the bread made by the conventional straight method has problems in that the activity and fermenting power of yeast deteriorate, which adversely affects the taste, flavor, and texture, and speeds up the aging process through which aerated bread becomes hard and stiff.

SUMMARY OF THE INVENTION

The present invention is directed to a method of making bread that can improve the activity and fermenting power of yeast to improve the taste, flavor, and texture of bread.

The present invention is also directed to a method of making bread that can slow the aging process to increase shelf life and maintain good quality for a long time.

In one aspect, the present invention provides a method of making bread including: a warm dough making process in which a warm dough is formed by heating a mixture of milk and salt, adding wheat flour to the heated mixture, aerating the resulting mixture, and ripening the resulting mixture at low temperature; a dough mixing process in which a dough is formed by mixing the resulting dough of the warm dough making process with wheat flour, dried yeast, refined sugar, refined salt, whole milk powder, bread improver, processed butter, milk, egg, and water, and stirring the mixture; a deep-freezing process in which the resulting dough is divided into equal-sized pieces and the divided dough pieces are deep-frozen; a thawing process in which the deep-frozen dough is thawed; a fermentation process in which the thawed dough is placed in a bread pan to be fermented; and a baking process in which the fermented dough is heated.

BRIEF DESCRIPTION OF THE DRAWINGS

The above and other objects, features and advantages of the present invention will be more apparent from the following detailed description taken in conjunction with the accompanying drawings, in which:

FIG. 1 is a flowchart illustrating a method of making bread in accordance with an exemplary embodiment of the present invention.

DETAILED DESCRIPTION OF THE INVENTION

Hereinafter, an exemplary embodiment of the present invention will be described in detail with reference to the accompanying drawings. In the following description, when it is deemed that describing certain well-known functions or components would detract from the clarity and concision of the description of the invention, the well-known functions or components will not be described.

FIG. 1 is a flowchart illustrating a method of making bread in accordance with an exemplary embodiment of the present invention. As shown in FIG. 1, a method of making brake in accordance with an exemplary embodiment of the present invention includes a warm dough making process (S110) as a first process, a dough mixing process (S120) and a deep-freezing process (S130) as a second process, and a thawing process (S140), a fermentation process (S150), and a baking process (S160) as a third process.

1. First Process

In the warm dough making process (S110), a warm dough is formed by heating a mixture of milk and salt, adding wheat flour to the heated mixture, aerating the resulting mixture, and ripening the resulting mixture at low temperature. The warm dough making process (S110) is performed to aerate a portion of the warm dough to be aged at low temperature at which the aging process is speeded up, and to mix the aerated dough with other dough, thus slowing the aging process. The warm dough making process (S110) uses the principle that when dough that has been aged once is to be aerated again, the aeration takes place at high temperature of about 120° C.

The warm dough making process (S110) includes a milk/salt heating step (S112) in which a mixture of milk and salt is heated to 95° C., a wheat flour addition step (S114) in which wheat flour is added to the heated mixture, an aeration step (S116) in which the resulting mixture is aerated and stirred, and a low-temperature ripening step (S118) in which the aerated dough is ripened at low temperature for 14 to 16 hours.

The milk/salt heating step (S112) includes a first heating step in which the mixture of milk and salt is heated at 60° C. for 30 minutes to increase the flavor of milk, and a second heating step in which the resulting mixture is again heated to 95° C. It is preferable that the temperature of the warm dough after the aeration step (S116) be maintained at 60 to 65° C.

Although the mixing ratio of wheat flour, salt, and milk in the warm dough making process (S110) may vary according to embodiments, it is preferable that 48 to 50% of wheat flour, 1 to 2% of salt, and 48 to 50% of milk be mixed.

2. Second Process

The dough mixing process (S120) is performed to form a dough by mixing the warm dough formed in the warm dough making process (S110) with wheat flour, dried yeast, refined sugar, refined salt, whole milk powder, bread improver, processed butter, milk, egg, and water, and stirring the mixture. In the dough mixing process (S120), the mixture is stirred at low and high speeds alternately, processed butter is added to the resulting mixture, and then the resulting mixture is stirred again at low and high speeds alternately. In the dough mixing process (S120) in accordance with the embodiment of the present invention, the warm dough, which has been aged in the warm dough making process (S110), is mixed with the dough formed in the dough mixing process (S120) so as to slow the aging process of the dough.

In the deep-freezing process (S130), the resulting dough is divided into equal-sized pieces and the divided dough pieces are deep-frozen. It is preferable that the deep-freezing process (S130) be performed at −35 to −40° C. for 40 minutes and the central temperature of the deep-frozen dough be maintained at −7 to −8° C. Then, the deep-frozen dough is stored in a freezing warehouse at about −20° C. so as to be shipped in the frozen state to bakeries.

3. Third Process

The thawing process (S140) is performed to thaw the deep-frozen dough. Preferably, the thawing process (S140) may include a low-temperature thawing step (S142) performed at 4 to 6° C. for about 16 hours, and a room-temperature thawing step (S144) performed at 23 to 26° C. for 2 hours after the low-temperature thawing step (S142). Moreover, it is preferable that the thawing process (S140) be performed a day before the sale of bread.

In the fermentation process (S150), the thawed dough is placed in a bread pan to be fermented. The fermentation process (S150) is performed at 36 to 37° C. and a relative humidity of 75 to 85% for 50 to 60 minutes.

The baking process (S160) is performed to heat the fermented dough. It is preferable that the baking process (S160) be performed in an oven in which the temperatures of upper and lower heating elements can be controlled, respectively. The baking process (S160) may be performed with the upper heating element at 170° C. and the lower heating element at 210° C. for about 35 minutes.

Meanwhile, when the first and second processes are performed in a manufacturing plant that mass-produces the dough for bread-making, and the third process is performed at a bakery that makes and sells bread, it is possible to maintain the quality and freshness of bread. That is, it is preferable that the frozen dough after the first and second processes be transported to each bakery, stored in the frozen state, and then thawed a day before sale to be fermented and baked.

Embodiment

A mixture of milk and salt was heated at 60° C. for 30 minutes and again heated to 95° C. Then, wheat flour was added to the heated mixture, aerated, and then stirred to form a warm dough. During stirring, the temperature was maintained at 60 to 65° C. Subsequently, the warm dough was ripened in a refrigerator at low temperature for 14 to 16 hours.

Then, the ripened dough was mixed with a mixture of wheat flour, dried yeast, refined sugar, refined salt, whole milk powder, bread improver, processed butter, milk, egg, and water, and stirred at a low speed of 30 rpm and at a high speed of 60 rpm alternately. During stirring, the temperature was maintained at 22 to 23° C., and the resulting dough was left at room temperature for 10 minutes.

Next, the resulting dough was divided into equal-sized pieces and the divided dough pieces were deep-frozen at −38° C. for 40 minutes. The temperature of the dough after the deep-freezing process was maintained at −7 to −8° C. The deep-frozen dough was stored in a freezing warehouse at −20° C. and then shipped to bakeries in the frozen state.

The bakery thawed the frozen dough at a low temperature of −5° C. for 16 hours, and then at room temperature of 25° C. for 2 hours, a day before the sale of bread. When the temperature of the bread dough became 18° C., the resulting dough was rolled out, given some ripening time, molded, and then placed in a bread pan.

Subsequently, the dough placed in the bread pan was fermented at a temperature of 37° C. and a relative humidity of 85% for 50 to 60 minutes. Then, the bread dough was placed in an oven and baked with the upper heating element at 170° C. and the lower heating element at 210° C. for 35 minutes, thus making the bread.

As described above, according to the method of making bread of the present invention, since the once-aged dough is mixed with other dough, it is possible to improve the activity and fermenting power of yeast, thereby increasing the taste, flavor, and texture of bread.

Moreover, according to the method of making bread of the present invention, it is possible to slow the aging process to increase shelf life and maintain a good quality.

While exemplary embodiments of the present invention have been described and illustrated, it should be understood that various modifications to the described embodiments, which may be evident to those skilled in the art, can be made without departing from the spirit and scope of the present invention as defined by the appended claims.

What is claimed is:

1. A method of making bread, comprising:
a thermally treated dough making process of forming a thermally treated dough through a milk/salt heating step of heating a mixture of 48 to 50% of milk and 1 to 2% of salt to 95° C., a wheat flour addition step of adding 48 to 50% of wheat flour to the heated mixture, an aeration step of aerating and stirring the mixture, a low-temperature ripening step of ripening the aerated mixture in a refrigerator for 14 to 16 hours to form a thermally treated dough;
a dough mixing process of mixing the thermally treated dough of the thermally treated dough making process with wheat flour, dried yeast, refined sugar, refined salt, whole milk powder, bread improver, processed butter, milk, egg, and water to form a dough mixture, and stirring the dough mixture;
a deep-freezing process of dividing the dough mixture into equal-sized dough pieces and deep-freezing the divided dough pieces at −38° C. for 40 minutes;
a thawing process comprising a low-temperature thawing step of primarily thawing the deep-frozen dough pieces at 5° C. for about 16 hours followed by a room-temperature thawing step of secondarily thawing the dough pieces at 25° C. for 2 hours;
a fermentation process in which the thawed dough is placed in a bread pan to be fermented; and
a baking process in which the fermented dough is heated.

* * * * *